US012604263B2

(12) United States Patent
Miranda et al.

(10) Patent No.: US 12,604,263 B2
(45) Date of Patent: *Apr. 14, 2026

(54) SYSTEMS AND METHODS TO CONTROL ACCESS IN AIR-TO-GROUND NETWORKS OPERATING IN UNLICENSED SPECTRUM

(71) Applicant: GOGO BUSINESS AVIATION LLC, Broomfield, CO (US)

(72) Inventors: Heinz A. Miranda, Cary, IL (US); James P. Michels, Lake Zurich, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,413

(22) Filed: Jun. 6, 2023

(65) Prior Publication Data

US 2023/0319702 A1 Oct. 5, 2023

Related U.S. Application Data

(63) Continuation of application No. 17/225,226, filed on Apr. 8, 2021, now Pat. No. 11,716,681.

(Continued)

(51) Int. Cl.
*H04W 48/20* (2009.01)
*H04W 48/04* (2009.01)
(Continued)

(52) U.S. Cl.
CPC ........... *H04W 48/20* (2013.01); *H04W 48/04* (2013.01); *H04W 56/0015* (2013.01); *H04W 84/06* (2013.01)

(58) Field of Classification Search
CPC . H04W 48/20; H04W 48/04; H04W 56/0015; H04W 84/06; H04W 48/06; H04W 48/12; H04B 7/18506
(Continued)

(56) References Cited

U.S. PATENT DOCUMENTS

| | | | |
|---|---|---|---|
| 6,081,514 A | 6/2000 | Raith | |
| 7,075,906 B2 | 7/2006 | Douglas et al. | |

(Continued)

FOREIGN PATENT DOCUMENTS

| | | | | |
|---|---|---|---|---|
| CA | 2808444 A1 * | 3/2012 | ........... | H04W 16/14 |
| CA | 3017741 A1 * | 10/2017 | ........... | H04W 72/23 |

(Continued)

OTHER PUBLICATIONS

International Application No. PCT/US2021/026308, International Search Report and Written Opinion, mailed Jul. 5, 2021.
(Continued)

*Primary Examiner* — Mahendra R Patel
(74) *Attorney, Agent, or Firm* — Holland & Hart LLP

(57) ABSTRACT

Techniques for controlling or managing uplink access of a UE to a base station using unlicensed spectrum includes signaling an indication of different uplink access constraints so the UE connects to the base station when the UE and/or the uplink direction between the UE and the base station meet the uplink access constraints. The indication may be broadcast in a reference or synchronization signal, e.g., by utilizing unused or undesignated bits. Uplink access constraints may include a threshold distance of UEs from the base station, interference in the uplink direction (which may differ from interference in the downlink direction), etc. Based on the indicated constraints, the UE may determine whether or not to consider the base station as a candidate serving cell for wireless network access. The UE may be an in-flight aircraft and the base station may be a logical cell of a network that provides in-flight connectivity services.

18 Claims, 6 Drawing Sheets

Related U.S. Application Data

(60) Provisional application No. 63/006,913, filed on Apr. 8, 2020.

(51) Int. Cl.
 *H04W 56/00* (2009.01)
 *H04W 84/06* (2009.01)

(58) Field of Classification Search
 USPC ................ 370/329, 328, 338, 341, 345, 350
 See application file for complete search history.

(56) References Cited

U.S. PATENT DOCUMENTS

| | | | |
|---|---|---|---|
| 8,503,364 B2 | 8/2013 | Zhang et al. | |
| 8,576,733 B2 | 11/2013 | Attar et al. | |
| 10,582,429 B2 | 3/2020 | Hou et al. | |
| 11,006,457 B2 * | 5/2021 | Shin | H04L 5/0023 |
| 11,716,681 B2 * | 8/2023 | Miranda | H04W 56/0015 |
| | | | 370/329 |
| 2007/0075280 A1 * | 4/2007 | Nakano | G01C 3/08 |
| | | | 356/3.01 |
| 2009/0213819 A1 | 8/2009 | Kalhan | |
| 2009/0257523 A1 * | 10/2009 | Varadarajan | H04B 1/04 |
| | | | 375/295 |
| 2012/0263059 A1 * | 10/2012 | Kim | H04W 36/0088 |
| | | | 370/252 |
| 2014/0169240 A1 | 6/2014 | Han | |
| 2015/0085792 A1 * | 3/2015 | Reddy | H04W 16/14 |
| | | | 370/329 |
| 2016/0100407 A1 * | 4/2016 | Gaal | H04L 5/0055 |
| | | | 370/329 |
| 2018/0241463 A1 * | 8/2018 | Lu | H04W 36/18 |
| 2019/0007179 A1 * | 1/2019 | Ly | H03M 13/09 |
| 2019/0090263 A1 * | 3/2019 | Luo | H04W 72/21 |
| 2019/0149285 A1 * | 5/2019 | Tsai | H04L 1/0026 |
| | | | 370/329 |
| 2019/0222364 A1 * | 7/2019 | Shimoda | H04W 80/02 |
| 2020/0229205 A1 * | 7/2020 | Bharadwaj | H04L 5/0053 |
| 2020/0288409 A1 * | 9/2020 | Li | H04W 52/242 |
| 2021/0321327 A1 * | 10/2021 | Miranda | H04W 48/04 |
| 2022/0070972 A1 * | 3/2022 | Belleschi | H04W 84/20 |
| 2023/0337129 A1 * | 10/2023 | Miranda | H04W 56/0015 |

FOREIGN PATENT DOCUMENTS

| | | | | |
|---|---|---|---|---|
| CA | 3029227 A1 * | 7/2019 | ........... | H04W 72/23 |
| CA | 3029818 A1 * | 7/2019 | ........... | H04W 76/19 |
| CA | 3029946 A1 * | 7/2019 | ............. | H04L 1/08 |
| CA | 3019679 C * | 2/2023 | ........... | H04B 1/713 |
| EP | 2874441 A1 * | 5/2015 | ........... | H04W 48/06 |
| EP | 3349512 A1 * | 7/2018 | ........... | H04W 48/06 |
| WO | WO-2018/009382 A1 | 1/2018 | | |
| WO | WO-2019079500 A1 * | 4/2019 | .......... | H04B 7/0696 |
| WO | WO-2019/101837 A1 | 5/2019 | | |

OTHER PUBLICATIONS

"Location based mobility enhancements for UAVs", Sony, 3GPP TSG RAN WG2 Meeting #101, Athens, Greece, Feb. 26-Mar. 2, 2018.

International Application No. PCT/US2021/026308, Written Opinion of the International Preliminary Examining Authority, mailed Feb. 16, 2022.

International Application No. PCT/US2021/026308, International Preliminary Report on Patentability, mailed May 24, 2022.

Intention to grant (signatures) Mailed on Feb. 24, 2025 for EP Application No. 21720938, 6 page(s).

\* cited by examiner

200

Payload                    Unused/Reserved

<u>300</u>
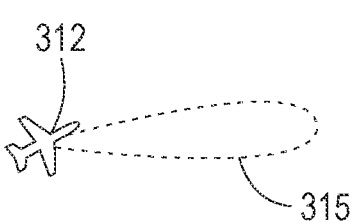
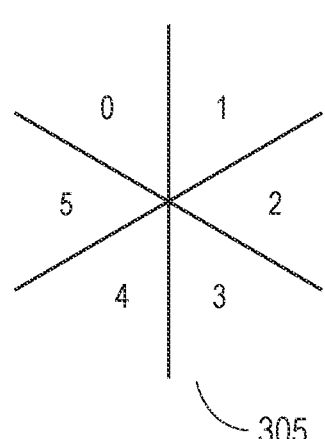
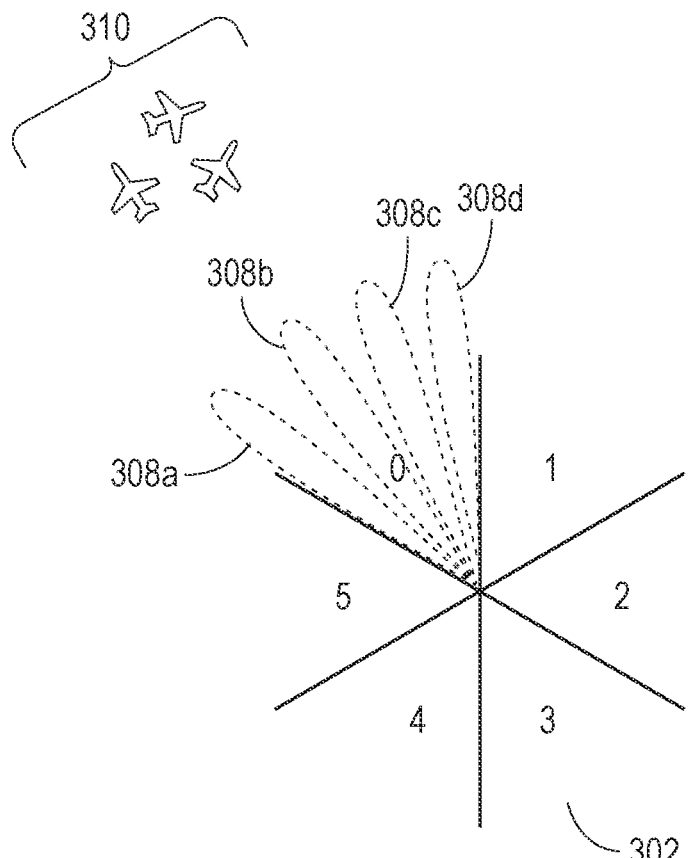
FIG. 3

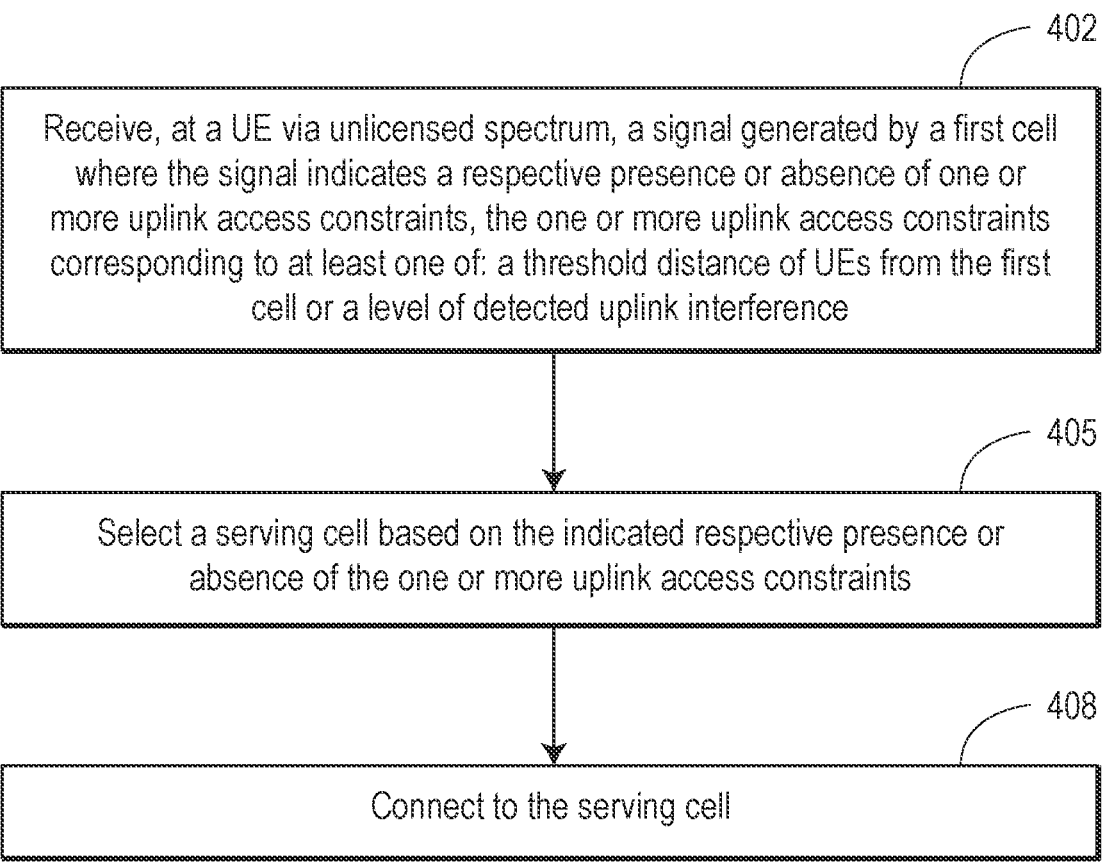

400

402

Receive, at a UE via unlicensed spectrum, a signal generated by a first cell where the signal indicates a respective presence or absence of one or more uplink access constraints, the one or more uplink access constraints corresponding to at least one of: a threshold distance of UEs from the first cell or a level of detected uplink interference

405

Select a serving cell based on the indicated respective presence or absence of the one or more uplink access constraints

408

Connect to the serving cell

Figure 5:
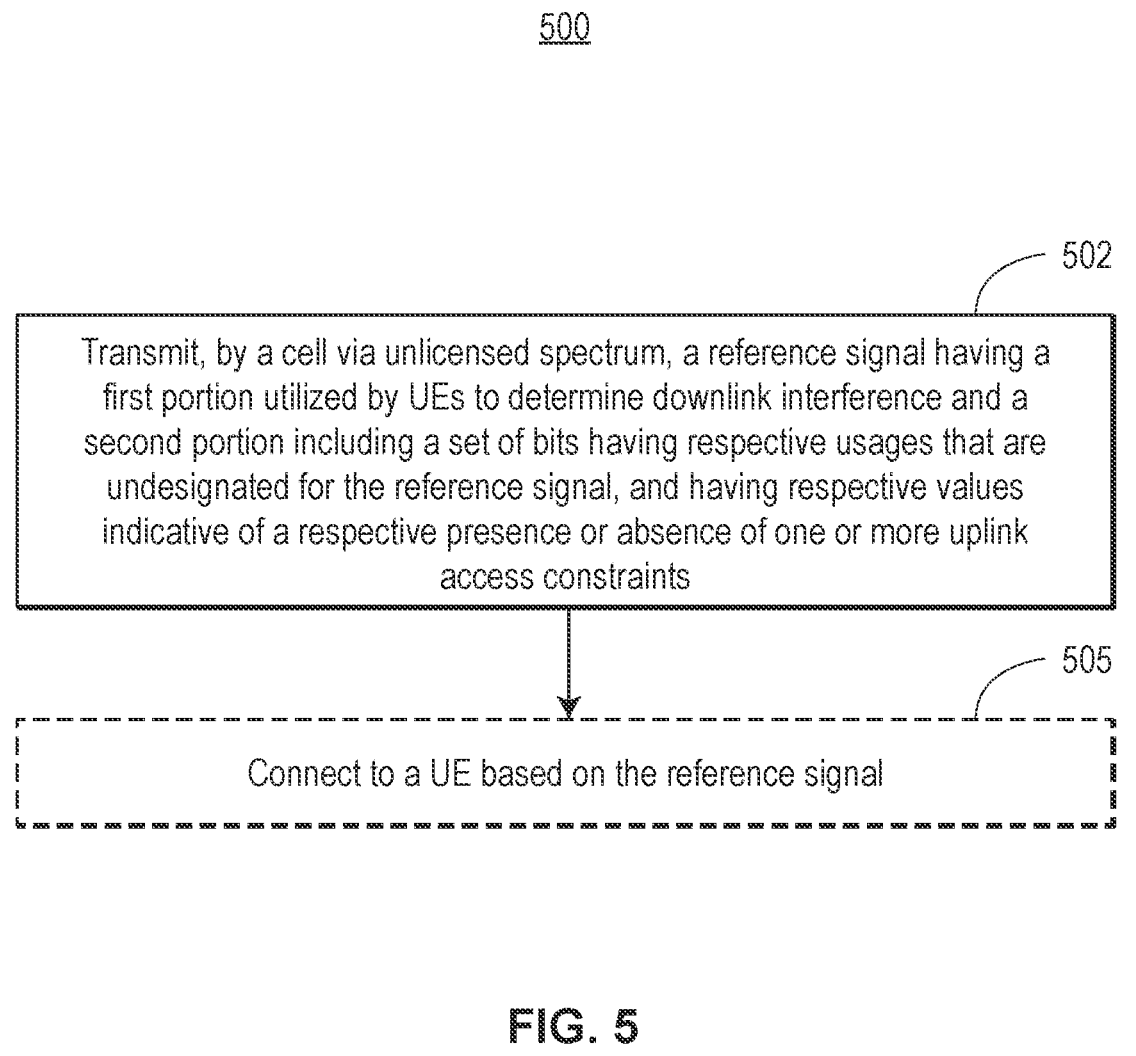

Transmit, by a cell via unlicensed spectrum, a reference signal having a first portion utilized by UEs to determine downlink interference and a second portion including a set of bits having respective usages that are undesignated for the reference signal, and having respective values indicative of a respective presence or absence of one or more uplink access constraints

505

Connect to a UE based on the reference signal

Processor(s) — 605
— 620

Controller(s) — 608

Memories — 610
☐ 612a
☐ 612b
☐ 612c

RAM — 615

Data Store — 622a

I/O — 618

User Interface — 632

Network Interface(s) — 625

— 628

— 630
Network(s)

Data Store — 622b

SYSTEMS AND METHODS TO CONTROL ACCESS IN AIR-TO-GROUND NETWORKS OPERATING IN UNLICENSED SPECTRUM

CROSS-REFERENCE TO RELATED APPLICATIONS

This application is a continuation of U.S. patent application Ser. No. 17/225,226 filed Apr. 8, 2021 and entitled "SYSTEMS AND METHODS TO CONTROL ACCESS IN AIR-TO-GROUND NETWORKS OPERATING IN UNLICENSED SPECTRUM", which claims priority to and the benefit of the filing date of U.S. Provisional Patent Application No. 63/006,913 filed Apr. 8, 2020 and entitled "SYSTEMS AND METHODS TO CONTROL ACCESS IN AIR-TO-GROUND NETWORKS OPERATING IN UNLICENSED SPECTRUM," the entire disclosures of which are incorporated herein by reference.

FIELD OF THE INVENTION

The present disclosure relates to in-flight aircraft utilizing air-to-ground networks for in-flight connectivity, and in particular to managing the connectivity and/or controlling the access of in-flight aircraft to air-to-ground networks operating in unlicensed spectrum.

BACKGROUND

For in-flight connectivity, in-flight aircraft may connect to an Air-To-Ground (ATG) network operating in unlicensed spectrum, such as those networks operating in the 2.4 GHz and/or other frequencies of unlicensed spectrum. Typically, base stations and/or in-flight aircraft detect, communicate, and respond to interference conditions (and/or effects thereof) as if such interference conditions have a similar effect in both the Radio Frequency (RF) uplink (e.g., in the direction of the base station) and downlink (e.g., in the direction of the in-flight aircraft or User Equipment (UE)) directions. However, in air spans or air spaces in which interference affects wireless communications in the unlicensed spectrum, the uplink may experience a different intensity of interference than the downlink, thereby making the Radio Frequency (RF) paths non-symmetric with respect to interference effects. That is, the level of uplink interference within an air span or air space may not correlate or correspond to the level of downlink interference.

As unlicensed spectrum may be accessed by different types of users, non-aircraft users of the unlicensed spectrum (e.g., Wi-Fi or other types of unlicensed spectrum users located on the ground) may be sources of potentially strong external interference in ATG in-flight connectivity networks which utilize the unlicensed spectrum. As such, to determine the best possible serving cell, the UE or aircraft measures a respective signal for all possible servers (e.g., all possible base stations or cells), and selects the one with the highest SI NR (Signal-to-Interference-plus-Noise Ratio) or other suitable measurement. However, although this approach guarantees that the selected serving cell will provide the best signal in the downlink direction (e.g., the direction towards the UE) among candidate serving cells, given the non-symmetric RF paths, this approach does not guarantee that the signal in the uplink direction (e.g., the direction towards the cell or base station) will be of good quality or even of sufficient quality to maintain a connection with the selected base station.

The 3GPP NR specification does not provide a mechanism to signal the UE and/or the base station of different direction-specific conditions prior to the UE connecting to the base station (such as when the interference level as observed by the cell/base station from the direction where the UE is located is too high to maintain a connection of sufficient quality), as the specification is meant to be used in licensed spectrum in which the levels of interference in both directions are somewhat correlated and/or in which carrier sense multiple access with collision avoidance may be utilized to mitigate interference effects. The 3GPP NR specification does provide the indications cellBarred, cellReservedForOperatorUse and cellReservedForOtherUse in the MIB (Master Information Block) and SIB (System Information Block) messages to prevent access to certain cells that are barred, reserved for operator use, and reserved for some other use, for example. However, these and other similar indications defined in the 3GPP NR specification only provide means to convey that the cell is not available at all or available only to some users. More significantly, these and other similar indications are distinguished at a cell or base station level of granularity and do not take into account differences in spatiality at the cell or base station. Unfortunately, the specification does not provide a mechanism to signal the UE when a cell and/or a spatial direction should not be accessed due to high reverse link interference and indicate that the mobile should look for other candidate cells.

Further, for implementations that support long range Air To Ground communications, the specification does not provide a mechanism to prevent far or distantly-located UEs from accessing a particular cell while allowing more closely-located UEs to access the particular cell, e.g., so that the particular cell may be optimally configured to service a large number of UEs that are more proximate to the particular cell. As such, a distantly located UE attempting to access a cell configured to cover many near or medium range UEs (e.g., a high capacity cell for servicing near/medium range UEs) would compromise the capacity of the cell. The specification does not provide a mechanism to indicate to UEs that a cell is a high capacity cell so that distantly-located UEs do not attempt to access the high capacity cell, but instead try to connect to other possible candidate cells.

SUMMARY

Embodiments of the invention described herein describes techniques, systems, and methods that manage in-flight aircraft connectivity in an Air-To-Ground (ATG) network which operates on 2.4 GHz and/or other frequencies of unlicensed spectrum, e.g., in an air span or air space containing potentially strong external interference sources. For example, the techniques, systems, and methods described herein may manage UE or aircraft access to a cell by signaling the occurrence of specific conditions in an uplink (UL) or downlink (DL) direction, where the conditions may differ between the uplink and downlink directions.

Generally, the techniques described herein provide a mechanism to control UE access to a cell or base station when conditions which are not contemplated by the 3GPP standard occur. For example, the techniques may utilize reserve bits (which are not utilized, defined, or designated within the 3GPP NR standard) of broadcasted signals for conveying information to the UEs indicating various conditions or constraints which may affect the UEs' respective uplink access to a cell. Additionally or alternatively, the techniques may limit the access of some UEs with conflicting radio requirements as compared to a majority of the UEs which may access a cell site, e.g., due to the relative distances of the UEs from the cell site. Still additionally or alternatively, the techniques may signal UEs of detected external interference, and in some embodiments, may indicate respective levels of external interference in different directions of the air space (e.g., different levels of uplink and/or downlink interference).

In an embodiment, the techniques utilized by the embodiments of the invention define the use of broadcast bits are which not used (e.g., which are reserved or undesignated) in the 3GPP NR specification for purposes of signaling a UE of specific, directional channel or network condition or constraint, and by doing so, control a UE's (e.g., an aircraft's) access to a cell. By signaling a UE of specific conditions or access constraints, such as high UL (uplink) external interference, different UE behaviors in response to the signaled condition(s) or constraint(s) may be implemented. For example, the UE may search for a different cell or server, or the UE may wait for a predefined time before re-attempting to access this cell. Similarly, by signaling UEs that a cell is intended to serve many connections of a certain type (e.g., the cell is configured as a high capacity cell that optimally services a certain type of connection) and/or is configured to optimally service UEs within a certain distance of the cell, UEs that are located far from the cell may look for a different cell or server. Additionally, if narrow beams are employed to broadcast the indicated access conditions or constraints, the indications signaled by the cell may be specific to the conditions or constraints in the spatial direction of the beam, and therefore different uplink access conditions or constraints of different beams of a single cell site may be indicated.

In an embodiment, a method for managing access of a User Equipment (UE) to a wireless network via unlicensed spectrum includes receiving, at the UE via the unlicensed spectrum, a signal generated by a first cell of the wireless network. The signal includes an indication of a respective presence or absence of one or more uplink access constraints of the first cell, where the one or more uplink access constraints include at least one of: a threshold distance of UEs from the first cell, or uplink interference detected by the first cell in a spatial direction of the UE. The method further includes selecting, by the UE, a serving cell of the wireless network based on the indicated one or more uplink access constraints, and connecting, by the UE, to the selected serving cell.

In an embodiment, a method for managing access of User Equipments (UEs) to a wireless network via unlicensed spectrum includes transmitting, within the unlicensed spectrum and by a cell of the wireless network, a reference signal having a first portion utilized by UEs to determine downlink interference and a second portion including a set of reserve bits having respective usages that are undesignated for the reference signal, where the set of reserve bits has a value indicative of a respective presence or absence of one or more uplink access constraints particular to the cell. A UE determines whether or not to communicatively connect to the cell based on the reference signal.

BRIEF DESCRIPTION OF THE DRAWINGS

FIG. 3 depicts a scenario in which embodiments of the methods, systems, and techniques for managing access of User Equipment(s) (UEs) to wireless networks via unlicensed spectrum are utilized.

FIG. 4 depicts a flow diagram of an example method for managing access of a User Equipment (UE) to a wireless network via unlicensed spectrum.

FIG. 5 depicts a flow diagram of an example method for managing access of a User Equipment (UE) to a wireless network via unlicensed spectrum.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
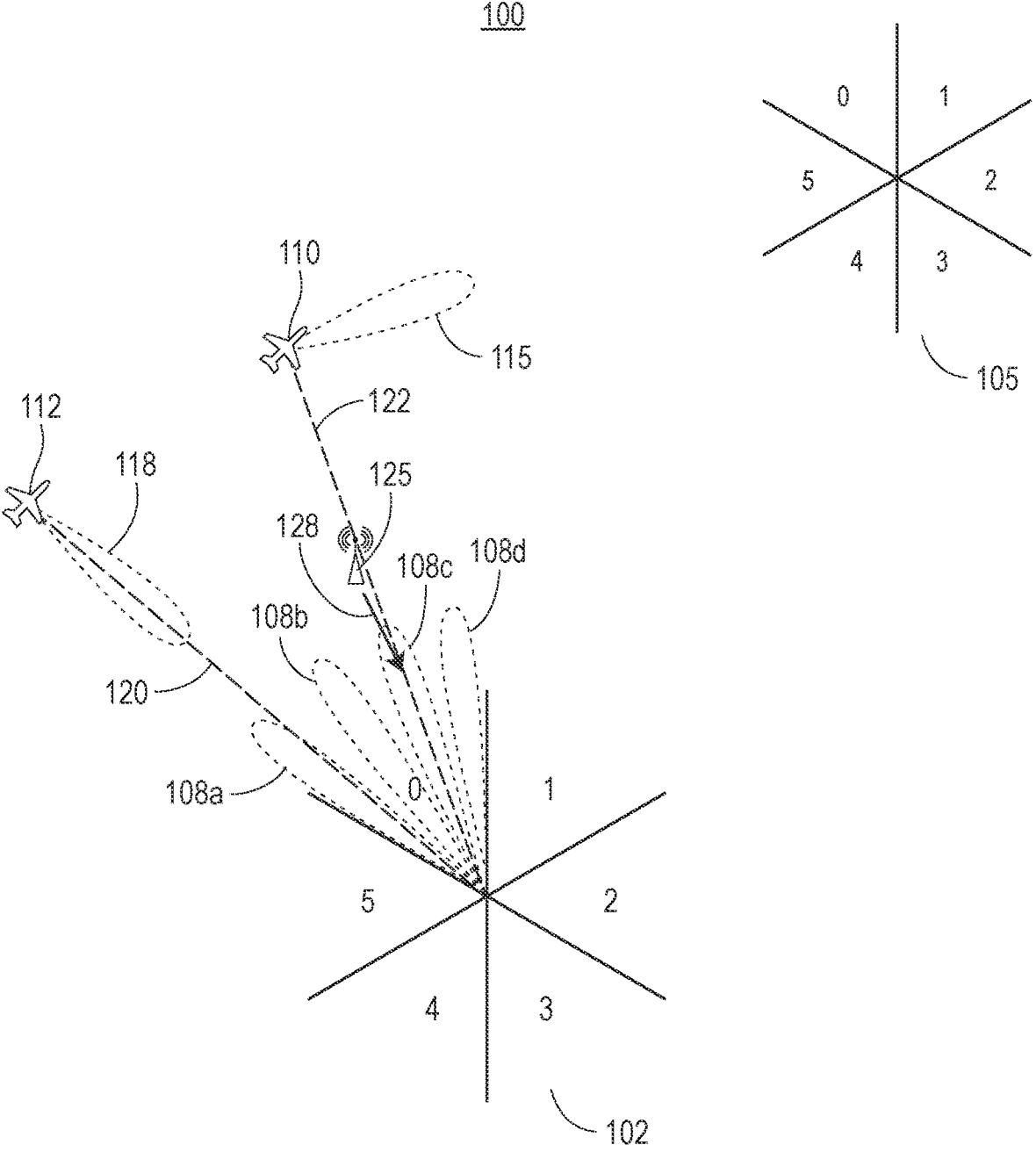
FIG. 1 depicts an example scenario in which embodiments of the methods, systems, and techniques for managing access of User Equipment(s) (UEs) to wireless networks via unlicensed spectrum are utilized.

FIG. 1 depicts an example scenario 100 in which embodiments of the methods, systems, and techniques for managing access of User Equipment(s) (UEs) to wireless networks via unlicensed spectrum are utilized. The scenario 100 of FIG. 1 depicts two base stations or cell sites 102, 105 of a wireless network, where the cell sites 102, 105 transmit and receive radio signals in the unlicensed spectrum. For example, at least one of the base stations 102, 105 may be a gNB (Next Generation Node B) of a 5G wireless network which utilizes NR (New Radio) technology in the unlicensed spectrum, and/or at least one of the base stations 102, 105 may be another type of logical radio node of another generation of wireless networks, such as a 6G wireless network, which utilizes corresponding radio technology in the unlicensed spectrum. Each base station 102, 105 respectively includes six sectors (denoted by labels 0, 1, 2, 3, 4, 5). In its sector 0, cell site 102 broadcasts four different reference signals 108a-108d in different spatial directions (e.g., different three-dimensional directions) for UEs to receive and process in order for the UEs to determine a suitable cell site to which the UEs may connect to the wireless network for in-flight connectivity. As utilized herein, the term "spatial direction" generally refers to an angular range (e.g., a three-dimensional angular range) corresponding to the beamwidth of a directional beam, such as the directional beams via which the reference signals 108a-108d are respectively transmitted. Additionally, in scenario 100, two User Equipment(s) (UEs) 110, 112 (which in the scenario 100 are depicted as being two aircraft 110, 112) are located within the service air span or air space of cell site 102. Each UE 110, 112, radiates a respective beam 115, 118 to detect reference signals of candidate serving cell sites, such as reference signals 108a-108d.

As additionally depicted in FIG. 1, within the line-of-sight or point-to-point direction between UE 112 and the cell site 102 (denoted by dashed line 120), no or negligible external interference exists. On the other hand, within the line-of-sight direction or point-to-point direction between UE 110 and the cell site 102 (denoted by dashed line 122), a land or ground base station 125 servicing land-based mobile devices radiates energy within the same unlicensed spectrum as utilized by the cell site 102 (e.g., to thereby allow the land base station 125 to provide land-based mobile devices with wireless connectivity via the unlicensed spectrum). As such, in the scenario 100, the land base station 125 is an external source of interference with respect to the UE 110 and the cell site 102. The cell site 102 detects and measures the interference generated by the land base station 125 in the line-of-sight direction 122 of the UE 110, as denoted by arrow 128. That is, the cell site 102 detects and measures the external interference in the uplink (UL) direction 128 of the line-of-sight direction 122 of the UE 110.

Upon detecting and determining that the level of uplink interference 128 is greater than an interference threshold, the cell site 102 informs the UE 110 (and any other UEs which are able to receive the reference signal 108c radiated in the spatial direction corresponding to the UE 110) of the detected, non-negligible uplink interference via the reference signal 108c. As such, the UE 110 is notified that it may need to consider other candidate cells (e.g., by processing the reference signals broadcasted by other candidate cells) to find a suitable cell via which the UE 110 may connect to the wireless network, at least due to the presence of a significant level of uplink external interference 128 detected between the cell site 102 and the UE 110 in the line-of-sight direction 122. Indeed, as shown in FIG. 1, in response to receiving the notification of the uplink interference 128 detected in the direction of the cell site 102, the UE 110 steers its antenna radiation pattern 115 to search for other suitable cells via which to access the wireless network, such as the cell site 105.

On the other hand, the cell site 102 does not detect any uplink interference in the uplink direction of the line-of-sight direction 118 between the cell site 102 and the UE 112. For example, the cell site 102 detects negligible uplink interference or a level of uplink interference less than the interference threshold in the uplink, line-of-sight direction 118 of the cell site 102 and the UE 112. Accordingly, the cell site 102 informs the UE 112 (and any other UEs which are able to receive the reference signal 108a radiated in the spatial direction corresponding to the UE 112) via the reference signal 108a that the cell 102 has detected no or negligible uplink interference in the respective spatial direction. Accordingly, the UE 112 may select the cell 102 as a serving cell, e.g., provided that the UE 112 also determines, based on the reference signal 108a, that downlink (DL) interference in the downlink direction of the line-of-sight direction 118 is also negligible or acceptable and that other access conditions/constraints are met.

Note that in the scenario 100, the base station 102 radiates its reference signals 108a-108n of sector 0 (and other reference signals of other sectors) in a directional manner, e.g., in different spatial directions, which may correspond to the different spatial directions of the narrow beams radiated by the base station. As such, the interference of an external source may be different for different spatial directions (e.g., spatial direction 108c has interference from source 125 above an interference threshold level, and spatial direction 108a dos not have interference from source 125 above the interference threshold level). Further, due to at least the different spatial directions of the different beams, some external signals may more strongly interfere with transmissions in a particular uplink spatial direction between the UE and the cell as compared to the corresponding downlink spatial direction. For example, in spatial direction 108c corresponding to the line-of-sight 122 between the UE 110 and the base station 102, the level of uplink interference 128 due to source 125 is greater than the level of downlink interference due to source 125. Thus, while the UE 110 may measure or otherwise determine (e.g., based on the reference signal 108c) the downlink interference between the UE 110 and the cell 102 to be of an acceptable level, nonetheless the UE 110 may not select the cell 102 as a serving cell when the reference signal 108c indicates the presence of significant uplink interference 128.

In an embodiment, each reference signal (e.g., signal 108a, 108b, 108c, 108d) broadcast by the cell site 102 may be a synchronization signal which UEs may process to determine candidate serving cells and/or to connect to a selected serving cell. For example, the 3GPP NR specification defines synchronization signals which are broadcasted by base stations, such as the Primary Synchronization Channel (PSS), the Secondary Synchronization Channel (SSS), and the physical broadcast channel (PBCH), which are generally collectively referred to as a Synchronization Signal/PBCH block or SSB. UEs may process SSBs (e.g., may decode SSBs) to determine a broadcasting cell's identity, to synchronize with the broadcasting cell, and/or to determine downlink power and/or downlink interference with respect to the broadcasting cell so as to select a most suitable serving cell among a set of candidate serving cells. For instance, the UE may determine downlink interference corresponding to a broadcasting cell by determining a SINR or other suitable measurement of the SSB broadcasted by the cell.

Figure 2:
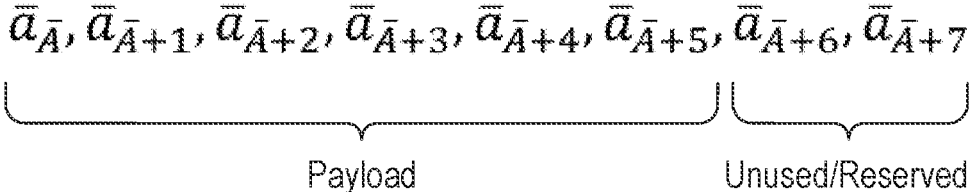
FIG. 2 illustrates an example downlink transmission which may be utilized in embodiments of the methods, systems, and techniques for managing access of User Equipment(s) (UEs) to wireless networks via unlicensed spectrum disclosed herein.

An example bit layout of a portion of an SSB 200 is illustrated in FIG. 2. The portion of the SSB 200 depicts the last eight bits $\bar{a}_{\bar{A}}$, $\bar{a}_{\bar{A}+1}$, $\bar{a}_{\bar{A}+2}$, $\bar{a}_{\bar{A}+3}$, . . . , $\bar{a}_{\bar{A}+7}$ of the PBCH payload, which the 3GPP NR specification defines or designates as conveying various physical layer information. For sub 6 GHz spectrums, the maximum number of SSB beams is either eight or four, and consequently the last two bits of the SSB, e.g., bits $\bar{a}_{\bar{A}+6}$ and $\bar{a}_{\bar{A}+7}$, are not used and are defined by the specification as being reserved, unused, or undesignated bits. Embodiments of the inventive techniques described herein may utilize these undesignated bits to signal indications of the presence or absence of one or more uplink access constraints or conditions to UEs, and thereby control the access of UEs to the cell. For example, in an example implementation:

(i) Bit $\bar{a}_{\bar{A}+6}$ may be utilized to indicate the presence or absence of UL interference above an interference threshold, as observed or determined by the broadcasting cell. For example, a bit value of zero may denote acceptable UL interference, and a bit value of one may denote a high or unacceptable UL interference, and (ii) Bit $\bar{a}_{\bar{A}+7}$ may be utilized to indicate the presence or absence of a threshold distance of UEs from the broadcasting cell, where the broadcasting cell is optimally configured to serve UEs that are located within a threshold distance of the cell. For example, a bit value of zero may denote that the cell services all UEs irrespective of the distances of UEs from the cell, and a bit value of one may denote that the cell is particularly configured to optimally and preferably service UEs located within the threshold distance.

That is, the cell may utilize bit $\bar{a}_{\bar{A}+6}$ of the SSB 200 to indicate the presence or an absence of an uplink access constraint corresponding to UL interference, and the cell may utilize bit $\bar{a}_{\overline{4}+7}$ to indicate the presence or absence of an access constraint corresponding to a threshold distance of UEs from the cell. Additional details of the use of threshold distances of UEs from cell sites is discussed in more detail elsewhere within this disclosure.

Advantageously, and as shown in FIG. 2, the SSB block 200 has a spatial characteristic, e.g., as indicated by the vector or spatial notation. Therefore, in this example implementation, the respective values of the bits $\bar{a}_{\overline{4}+6}$, $\bar{a}_{\overline{4}+7}$ may be different for a respective SSB transmitted in a different spatial direction by the cell, thereby reflecting the respective channel conditions and/or other uplink access constraints in the different spatial directions with respect to the cell (e.g., on a per-beam basis). For example, in the case of UL interference, external interference sources on the ground may cause high levels of interference only in a specific direction, and consequently the value of $\bar{a}_{\overline{4}+6}$ may be different across different SSB beams. For instance, referring to FIG. 1 to illustrate, the SSB transmitted in the spatial direction 108c may have the value of corresponding bit $\bar{a}_{\overline{4}+6}$ set to "1" to indicate that an unacceptable level of UL interference is detected by the cell 102 in the spatial direction 108c (e.g., due to external interference source 125), and the SSBs respectively transmitted in the spatial directions 108a, 108b, and 108d may have the value of bit $\bar{a}_{\overline{4}+6}$ set to "0" to indicate that no or an acceptable level of UL interference is detected by the cell 102 in the respective spatial directions 108a, 108b, 108d.

Accordingly, in this embodiment, when the cell 102 sets the value of bit $\bar{a}_{\overline{4}+6}$ of an SSB 200 to "1" (e.g., the SSB transmitted in the spatial direction 108c, as shown in FIG. 1), the cell 102 thereby notifies the UE 110 that the respective sector (e.g., sector 0 of cell 102, as shown in FIG. 1) is under high UL interference in the direction 122 of the corresponding SSB beam 108c, and as such the UE 110 should search for other candidate cells for connecting to the wireless network. For example, as illustrated in FIG. 1, a land interferer 125 has a direct line-of-sight to cell 102 and offers strong interference to the SSB region denoted by 108c. The UE 110 is under the coverage of the SSB region denoted by 108c, and thus receives a broadcasted SSB with the bit $\bar{a}_{\overline{4}+6}$ set to "1." Consequently, the UE 110 proceeds to search for other candidate serving cells, such as sector 5 of cell 105, as denoted by the spatial direction of the beam 115 generated by the UE 110. The UE 112, however, is under the coverage of the SSB region denoted by 108a and, as such, receives an SSB with the bit $\bar{a}_{\overline{4}+6}$ set to "0" and consequently proceeds to attempt access to sector 0 of cell 102, as denoted by the spatial direction of the beam 118 generated by the UE 112.

Additionally or alternatively, in this example implementation, by setting the value of the bit $\bar{a}_{\overline{4}+7}$ of SSB 200 to "1," a cell may indicate to UEs that UEs which are at a respective spatial distance, with respect to the cell, that is greater than a predefined threshold (e.g., 250 Km, or some other distance which would require a Time Division Duplex (TDD) split based on physical layer structure) should search for other candidate cells with which to connect. That is, the cell may limit or constrain uplink access of UEs to the cell based on the respective spatial distances of the UEs from the cell.

To illustrate, FIG. 3 depicts an example scenario 300 in which such a situation occurs. In FIG. 3, a cell 302 is particularly configured to service a large number of UEs 310 at a relatively close range. That is, the cell 302 is a high capacity cell optimally configured to service high numbers of near or medium range UEs 310 such as, for example, when the cell 302 is configured to provide coverage for in-flight connectivity at or near an airport in a high air traffic corridor. For instance, the cell 302 may be configured to utilize a TDD frame configuration which is optimized for UEs 310 located within the predefined threshold distance from the cell 302. As such, the cell 302 limits access of UEs based on their respective distances from the cell 302, e.g., to avoid needing to reconfigure the TDD frame configuration, and/or to enable the high capacity service which the cell 302 is to provide at its respective location or environment within the wireless network.

In the scenario 300, a far or distantly-located UE 312 may receive the broadcasted transmissions of the cell 302, such as SSBs, with sufficient SINR (e.g., based on an SINR threshold) for connection. However, as the cell 302 has been particularly configured as a high capacity cell to service low or medium range UEs 310, the cell 302 sets the value of bit $\bar{a}_{\overline{4}+7}$ in the broadcasted SSB to "1." Based on the value of bit $\bar{a}_{\overline{4}+7}$ of the SSB being set to "1," and based on the spatial distance of the UE 312 from the cell 302 being greater than the threshold distance, the UE 312 does not attempt to access cell 302 even though the SINR is sufficient, and instead searches for other candidate serving cells, such as cell 305, as denoted in FIG. 3 by the spatial direction of the beam 315 generated by the UE 312.

As such, the techniques illustrated in FIG. 3 may prevent or avoid the usage of a TDD frame configuration that is not able to meet the data demands of a distantly-located UE 312 without significantly compromising the demands of other, more closely-located UEs 310. Additionally or alternatively, the techniques illustrated in FIG. 3 may prevent or avoid a reconfiguration of the entire cell 302 with a TDD frame configuration which may be suitable for the distantly-located UE 312, but which would also waste capacity of the cell 302 and impact the throughput of the other more closely-located UEs 310 serviced by the cell 302. Accordingly, in an embodiment in which the cell 302 is a high capacity cell configured to service near or medium range UEs, the radio configuration may be the consistent or the same across the entire cell 302, and thus the value of the $\bar{a}_{\overline{4}+7}$ bit would be set to a value of "1" in all SSBs broadcast by the cell 302.

FIG. 4 depicts a flow diagram of an example method 400 for managing access of a User Equipment (UE) to a wireless network via unlicensed spectrum in accordance with at least some of the principles and techniques disclosed herein. The method 400 may operate in conjunction with the scenarios and/or environments illustrated in FIGS. 1 and 3, and/or in other environments in which UEs attempt to access wireless networks via cells or base stations via the unlicensed spectrum. In an embodiment, a UE (such as UE 110, UE 112, or UE 312) may execute at least a portion of the method 400. For example, one or more processors of the UE may execute instructions stored on one or more tangible memories of the UE to execute at least a portion of the method 400. The method 400 may include additional or alternate steps, in embodiments.

At a block 402, the method 400 may include receiving, at a UE via the unlicensed spectrum, a signal generated and transmitted by a first cell of the wireless network. The signal may be a reference signal, a synchronization signal, or another type of signal broadcasted by the first cell, for example. The signal may include an indication of a respective presence or absence of one or more uplink access constraints of the first cell. The one or more constraints for accessing the first cell via an uplink may include a threshold distance of UEs from the first cell (e.g., a threshold spatial distance), uplink interference detected by the first cell in an uplink spatial direction corresponding to the UE, and/or other types of conditions or constraints on UEs and/or on the air space between the UEs and the first cell for uplink access to the first cell. In an embodiment, the respective presence or absence of the one or more uplink access constraints may be indicated by values of bits in included in the signal transmitted by the first cell. For instance, the respective presence of absence of various uplink access conditions may be indicated in a value of a set of reserved or undesignated bits of an SSB broadcasted by the first cell, such as in a manner described with respect to FIG. 2.

At a block 405, the method 400 may additionally include selecting, by the UE, a serving cell of the wireless network based on the indication of the respective presence or absence of the one or more uplink access constraints of the first cell. Generally speaking, when the UE and/or the uplink direction between the UE and the first cell meets all uplink access constraints indicated as being present at the first cell, the UE may continue to evaluate the received signal (e.g., the received SSB) for further suitability as a serving cell. For example, the UE may determine a level of downlink interference between the UE and the first cell based on other information included in the received signal. When the level of downlink interference is determined or measured to be acceptable, the UE may include the first cell in a set of candidate cells among which the UE selects 405 a serving cell. Indeed, if the first cell is the most suitable cell among the set of candidate cells, the UE may select 405 the first cell as the serving cell.

On the other hand, when the UE and/or the uplink direction between the UE and the first cell does not meet all uplink access constraints indicated as being present, the UE may exclude the first cell from a set of candidate cells among which the UE selects 405 a suitable serving cell. That is, the UE may avoid selecting 405 the first cell as a serving cell when the UE and/or the uplink direction between the UE and the first cell does not meet all uplink access constraints which are indicated by the first cell as being present. Alternately, when the UE and/or the uplink direction between the UE and the first cell does not meet all uplink access constraints indicated as being present, the UE may wait for a predetermined amount of time to elapse, and subsequently evaluate another reference signal transmitted by the first cell (e.g., a second received SSB) which may include an updated set of indications corresponding to the presence or absence of one or more uplink access constraints. The UE may include or exclude the first cell from the set of candidate serving cells in accordance with the updated indication.

In some situations, the received signal may indicate the presence of the uplink access constraint at the first cell corresponding to threshold distance, thereby signifying that the first cell is configured as a high capacity cell and/or is configured to optimally service UEs located within the threshold distance. The UE may meet the threshold distance constraint when the UE is located at a spatial distance from the first cell less than or equal to the threshold distance, and the UE may not meet the threshold distance constraint when the UE is located at a spatial distance from the first cell greater than the threshold distance. The threshold distance may be predefined and stored in a memory of the UE, in an embodiment.

In some situations, the received signal may indicate the presence of an undesirable level of uplink interference detected by the first cell in the spatial direction corresponding to the UE. That is the received signal may indicate a level of uplink interference detected by the first cell in the spatial direction corresponding to the UE greater than an interference threshold. The level of uplink interference in the spatial direction between the UE and the first cell may differ from the level of downlink interference in the spatial direction between the UE and the first cell, for example. In these situations, the UE may exclude the first cell from the candidate set of cells among which the UE selects 405 a serving cell, or the UE may wait for a predetermined time after which the UE processes another received signal potentially including an indication of an update to the presence or absence of the undesirable level of uplink interference, and responds accordingly.

At a block 408, the method 400 may include connecting, by the UE to the selected serving cell, e.g., upon selecting the serving cell.

FIG. 5 depicts a flow diagram of an example method 500 for managing access of a User Equipment (UE) to a wireless network via unlicensed spectrum in accordance with at least some of the principles and techniques disclosed herein. The method 500 may operate in conjunction with the scenarios and/or environments illustrated in FIGS. 1 and 3, and/or in other environments in which UEs attempt to access wireless networks via cells or base stations via the unlicensed spectrum. In an embodiment, a base station or cell site (e.g., the base station 102, 105, 302, 305) may execute at least a portion of the method 500. For example, one or more processors of the base station may execute instructions stored on one or more tangible memories of the UE to execute at least a portion of the method 500. In an embodiment, the method 500 executes in conjunction with the method 300, e.g., within a wireless network air span or air space. The method 500 may include additional or alternate steps, in embodiments.

At a block 502, the method 500 may include transmitting a reference signal within the unlicensed spectrum and by a cell of the wireless network. The reference signal may be a synchronization signal or another type of signal broadcasted by the cell, for example. The reference signal may include an indication of a respective presence or absence of one or more uplink access constraints of the cell, where the one or more constraints for accessing the cell via an uplink include a threshold distance of UEs from the first cell (e.g., a threshold spatial distance), uplink interference detected by the first cell (e.g., in the uplink spatial direction corresponding to the UE), and/or other types of conditions or constraints on UEs and/or on the airspace between the UEs and the cell for uplink access to the cell. In an embodiment, the reference signal may have a first portion which is utilized by UEs to determine downlink interference and a second portion including a set of reserve bits having respective usages that are undesignated for the reference signal. The set of reserve bits may have a value indicative of a respective presence or absence of one or more uplink access conditions or constraints particular to the cell, such as in a manner described with respect to FIG. 2. Generally speaking, a UE may consider the cell to be a candidate cell when the UE and/or the uplink direction in the airspace between the UE and the cell meets all indicated uplink access constraints, and the UE may avoid or delay consideration of the cell as a candidate cell when the UE and/or the uplink direction in the airspace between the UE and the cell does not meet at least one indicated uplink access constraint, e.g., in a manner such as described elsewhere within this disclosure.

As one of the uplink access constraints may correspond to uplink interference in the spatial direction between the UE and the cell (which may differ in levels from any downlink interference in the same spatial direction), in some embodiments (not shown), the method 500 includes detecting or determining, by the cell, a level of the uplink interference within the unlicensed spectrum, and determining whether or not the level of uplink interference exceeds an interference threshold. The determination of the uplink level of interference may be made without consideration to or independently of the determination of any levels of downlink interference, for example. The method 500 may further include indicating, in the reference signal, the presence or absence of detected or determined excess uplink interference, e.g., by setting or not setting the values of the set of reserve bits of the reference signal accordingly. In some embodiments (not shown), the method 500 includes determining a respective level of uplink interference within the unlicensed spectrum for each spatial direction of a plurality of spatial directions corresponding to the plurality of beams radiated by the cell. In these embodiments, the method 500 may include determining whether or not each respective level of uplink interference exceeds the interference threshold, and indicating the presence or absence of excess uplink interference in each spatial direction in a respective reference signal radiated in the corresponding spatial direction, e.g., by setting or not setting the values of the set of reserved bits within the respective reference signal accordingly.

In some situations, such as when the cell is configured to utilize a Time Division Duplex (TDD) frame configuration optimized for UEs located within a threshold distance from the cell (e.g., 250 km or some other suitable threshold distance), and/or the cell is configured as a high capacity cell within the wireless network, transmitting 502 the reference signal may include transmitting at least one reserve bit of the reference signal having a value indicating the presence of an uplink access constraint corresponding to a threshold distance from the cell. In these situations, the UE communicatively connects to the cell when a spatial distance of the UE from the cell is less than or equal to the threshold distance, and the UE avoids or delays consideration of the cell as a candidate serving cell when the spatial distance of the UE from the cell exceeds the threshold distance.

At an optional block 505, the method 500 may include connecting to a UE based on the reference signal. For example, the base station may connect with a UE which has determined, based at least in part on the reference signal transmitted by the base station, that the base station is a most suitable candidate cell among a set of candidate cells. Upon communicatively connecting with the UE, the base station may be the serving cell of the UE thereby communicatively connect the UE with the wireless network.

Figure 6:
FIG. 6 is a block diagram of an example computing system which may be used in conjunction with embodiments of the techniques described herein.

Turning now to FIG. 6, FIG. 6 is a block diagram of an example computing system 600 which may be used in conjunction with embodiments of the systems, methods, and techniques described herein. The system 600 includes one or more computing devices 602 which may be particularly configured to automatically control one or more components of wireless communications networks and systems operating in unlicensed spectrum, such as base stations, cell sites, gNB, aircraft, other types of UEs, and or respective parts or sub-components thereof. For example, different instances of at least portions of the computing system 600 may be respectively located at base stations, cell sites, gNBs, and/or other types of ground stations; and/or in aircraft or other types of UEs. As such, the computing device 602 may be communicatively connected to one or more sub-components of resident components of the wireless communications system, such as transceivers, transmitters, receivers, modulators, demodulators, base band units, remote radio units, radios, antennas, and the like, and may respectively control at least a portion of the behaviors of the same.

As illustrated in FIG. 6, the one or more computing devices 602 associated with the wireless communications network using the unlicensed spectrum may include, for example, one or more processors and/or controllers, computers, portable computing devices (such as a tablets, laptops, mobile devices, etc.), servers, a plurality of networked or banked computing devices or servers having a logical appearance of a single computing device or server, a plurality of cloud computing devices, etc. Accordingly, for ease of discussion only and not for limitation purposes, the set of computing devices 602 is referred to herein using the singular tense, although in some embodiments the computing device 602 may include more than one physical computing device.

The computing device 602 may include ay include, for example, one or more processors 605 (e.g., central processing units or CPUs, digital signal processors or DSPs, microprocessors, etc.), one or more controllers 608 (e.g., radio resource controllers), one or more program memories 610 storing one or more sets of computer-readable and/or computer-executable instructions, e.g., instructions 612*a*-612*c*, a random-access memory (RAM) 615, and an input/output (I/O) circuit 618, all of which may be interconnected via an address/data bus 620. The one or more program memories 610 may comprise one or more tangible, non-transitory computer-readable storage media and/or devices, and the computer-readable and/or computer-executable instructions 612*a*-612*c* stored thereon, when executed by the processor 605, may cause the computing device 602 to perform one or more of the methods 400, 500 disclosed herein and/or portions thereof. For example, at least some of the computer-executable instructions 612 may be executable to set bit values in reference signals, to perform coding and/or decoding of reference signals, to perform at least a portion of the method 400, to perform at least a portion of the method 500, to control of one or more components of the Air-To-Ground system, and/or to perform one or more other applications associated therewith.

In doing so, the computing device 602 may access one or more data or memory stores 622*a*, 622*b* at which data corresponding to the system 600 may be stored. The one or more data stores 622 may comprise, for example, one or more memories, one or more memory devices, a data bank, cloud data storage, and/or one or more other suitable data storage devices. At least one of the data or memory stores 622*a* may be included in the computing device 602, and the processor(s) 605 of the computing device 602 (or the instructions 612*a*-612*c* executed by the processor(s) 605) may access the one or more data stores 622 via a link comprising a read or write command, function, application programming interface, plug-in, operation, instruction, and/or similar (which may, in turn, also be provided by the computing device 602, an embodiment), and/or via the bus 620.

In embodiments, the computing device 602 may access a remotely-located data store 622*b* via one or more network or communication interfaces 625 that are respectively coupled to a link 628 in communicative connection with the one or more remote data stores 622*b*. The link 628 in FIG. 6 is depicted as a link to one or more private and/or public networks 630, however, the network 630 is not required for the computing device 602 and the remotely-located data storage device 622*b* to be communicatively connected. For example, the link 628 may provide a direct connection between the computing device 602 and the data store 622*b*.

The link 628 may include one or more wired links and/or one or more wireless links, and/or may utilize any suitable communications technology. The network 630 may include one or more proprietary networks, the public Internet, one or more virtual private networks, and/or some other type of network, such as dedicated access lines, plain ordinary telephone lines, satellite links, data networks, combinations of these, etc.

In embodiments, the system 600 may include a user interface 632 via which an operator may set and/or change thresholds and/or other parameters, such as interference thresholds and/or distance thresholds.

It is noted that while in FIG. 6, the computing device 602, the data stores 622a, 622b, of the system 600 are illustrated as separate and distinct entities, this is only one of many embodiments. Any number of any of the devices 602 and/or data stores 622 may be included in the network 630, for example. Additionally or alternatively, any number of any of the devices 602 may be a logical, combined or integral device or set of devices.

Further, with regard to the computing device 602, while the instructions 612 are shown as three different blocks 612a, 612b, 612c in FIG. 6, it will be appreciated that the instructions 610 may include any number of different programs, modules, routines, and/or sub-routines that may collectively cause the computing device 602 to implement their respective functionality. Still further, it should be appreciated that although only one processor 605 is shown, the computing device 602 may include multiple processors 605, such as one or more Central Processing Units (CPUs) and/or one or more Digital Signal Processors (DSPs). Additionally, although the I/O circuit 618 is shown as a single block, it should be appreciated that the I/O circuit 618 may include a number of different types of I/O circuits. Similarly, the memories 610, 615 of the computing device 602 may include multiple RAMs 615 and/or multiple program memories 610. Further, while the instructions 612 are shown being stored in the program memory 610, any or all of the instructions 612 may additionally or alternatively be partially or entirely stored in the RAM 615 and/or other suitable local memory (not shown).

The RAM(s) 615 and/or program memories 610 may be implemented as semiconductor memories, magnetically readable memories, chemically or biologically readable memories, and/or optically readable memories, and/or may utilize any suitable memory technology or technologies. The computing device 602 may also be operatively connected to the network 630 via the link 628 and the I/O circuit 618, in some embodiments.

Embodiments of the techniques described herein provide significant advantages and benefits over known techniques. As previously discussed, the 3GPP standard specification does not provide a mechanism for a base station to notify UEs of high levels of interference in the uplink direction, as the 3GPP standard is particularly architected for licensed spectrums in which no explicit indication of external interference is required and/or in which carrier sense multiple access with collision avoidance may be employed. However, in unlicensed spectrums, as at any time, different types of users, base stations, and communications systems other than ATG users, base stations, and communications systems may utilize such unlicensed spectrums, such other types of users, base stations, and/or systems may at any time be sources of external interference for ATG wireless networks and, unfortunately, the 3GPP standard does not provide mechanisms for the base station to notify UEs of high levels of detected UL interference for uplink access purposes. Further, even though the potential external interference sources may generate interference of a directional nature (e.g., UL and DL), the UE is not able to ascertain or otherwise determine the differences between the levels of UL and DL interferences. Still further, known techniques are not able to signal different uplink access conditions or constraints on a per spatial direction basis, and known techniques are not able to prevent or discourage the uplink access of UEs which may require different TDD configurations (e.g., remotely-located UEs) and therefore may significantly decrease the capacity and/or performance of a sector or cell, or even may bring down the sector or cell as a whole.

Fortunately, as discussed above, the novel and non-obvious techniques disclosed herein address these and other disadvantages. For example, the techniques described herein avoid changes to the 3GPP standard for bands of unlicensed spectrum under 6 GHz, and thus minimize the impact on UE and base station software modifications. For example, embodiments of the techniques described herein make use of bits that are available but not used in some frequency configurations, and as such otherwise are wasted capacity. Additionally, the techniques described herein allow the UE to be informed of changes in channel conditions that have a spatial dimension before the UE attempts to access the cell. Importantly, the novel techniques described herein help to mitigate unexpected external UL interference in ATG wireless network, and/or to control UL access of remotely-located UEs to cells which are particularly configured to service a large number of near to medium range UEs within an ATG network, thereby increasing the efficiency of such cells.

Therefore, as described above, the novel techniques described herein enable a high standard of access reliability of the uplink and downlink connectivity between the aircraft and serving base station cells to be maintained, as well as help to manage high capacity cells in an efficient manner.

Further, while the systems, methods, and techniques described herein may be applicable to UEs which are in-flight aircraft and wireless network which are air-to-ground communications networks which operate using unlicensed spectrum, one skilled in the art will recognize that the systems, methods, and techniques described may easily be applied to UEs which are personal electronic devices (e.g., laptops, smart devices, tablets, etc.) and to UEs which are ships, cars, buses, or other type of vehicles. Additionally, one skilled in the art will recognize that the systems, methods, and techniques described herein may easily be applied to wireless networks which provide land or ground-based wireless connectivity and/or which provide wireless connectivity for vehicles and devices traveling over oceans, lakes, and other bodies of water.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed is:

1. A method for managing access of User Equipments (UEs) to a wireless network via an unlicensed spectrum, the method comprising:
transmitting, by a cell of the wireless network and to the UEs, a reference signal that includes one or more bits indicating a presence or an absence of one or more uplink access constraints determined by the cell, the one or more uplink access constraints comprising at least one of:
one or more respective threshold distances of each UE of the UEs from the cell, or
one or more threshold levels of uplink interference detected by the cell in one or more spatial directions; and
connecting, by the cell, to a UE of the UEs based on the reference signal.

2. The method of claim 1, wherein the transmitting of the reference signal includes broadcasting the reference signal.

3. The method of claim 2, wherein the broadcasting of the reference signal includes broadcasting the reference signal including a first set of bits associated with a level of downlink interference corresponding to the cell and a second set of bits comprising the one or more bits indicating the presence or the absence of the one or more uplink access constraints determined by the cell.

4. The method of claim 3, wherein the reference signal is a synchronization signal, and the second set of bits includes reserve bits which are undesignated bits of the synchronization signal.

5. The method of claim 3, further comprising:
broadcasting a plurality of reference signals in the one or more spatial directions, the plurality of reference signals including the reference signal, wherein the respective one or more bits included in each reference signal are indicative of respective presences or absences of the one or more uplink access constraints determined by the cell in a respective spatial direction of the one or more spatial directions.

6. The method of claim 1, wherein the one or more respective threshold distances comprise one or more predefined threshold.

7. The method of claim 1, further comprising:
detecting, by the cell, a first level of uplink interference in a first spatial direction;
determining whether the first level of the uplink interference in the first spatial direction exceeds a first threshold level of uplink interference; and
setting respective values of the one or more bits to indicate whether the first level of the uplink interference in the first spatial direction exceeds the first threshold level of uplink interference, and wherein the transmitting of the reference signal includes transmitting the reference signal in at least the first spatial direction.

8. The method of claim 1, wherein the connecting, by the cell, to the UE based on the reference signal includes connecting, by the cell, to the UE upon the UE selecting the cell as a serving cell based on the reference signal.

9. The method of claim 1, wherein the UE is an in-flight aircraft and the wireless network is an air-to-ground (ATG) connectivity wireless network.

10. A cell of a wireless network, the cell configured to manage access of User Equipments (UEs) to the wireless network via unlicensed spectrum, and the cell comprising:
one or more transceivers via which the cell is configured to:
transmit, via the unlicensed spectrum to the UEs, a reference signal that includes one or more bits indicative of a presence or an absence of one or more uplink access constraints determined by the cell, the one or more uplink access constraints comprising at least one of:
one or more respective threshold distances of each UE of the UEs from the cell, or
one or more threshold levels of uplink interference detected by the cell in one or more spatial directions; and
connects to a UE of the UEs based on the reference signal.

11. The cell of claim 10, wherein transmission of the reference signal includes a broadcast of the reference signal.

12. The cell of claim 11, wherein the reference signal includes a first set of bits associated with downlink interference corresponding to the cell and a second set of bits comprising the one or more bits indicative of the presence or the absence of the one or more uplink access constraints determined by the cell.

13. The cell of claim 11, wherein the reference signal is a synchronization signal, and the one or more bits are included in a set of reserve bits which are undesignated bits of the synchronization signal.

14. The cell of claim 11, wherein:
the cell is further configured to broadcast, via the one or more transceivers, a plurality of reference signals in the one or more spatial directions, the plurality of reference signals including the reference signal; and
the respective one or more bits included in each reference signal of the plurality of reference signals are indicative of respective presences or absences of the one or more uplink access constraints determined by the cell in a respective spatial direction of the one or more spatial directions.

15. The cell of claim 10, wherein the one or more threshold distances comprise one or more predefined threshold distances.

16. The cell of claim 10, further comprising:
a set of computer-executable instructions that are stored on one or more memories of the cell and that, when executed by one or more processors of the cell, are configured to cause the cell to:
determine whether a first level of uplink interference detected by the cell in a first spatial direction exceeds a first threshold level of uplink interference; and
set respective values of the one or more bits to indicate whether the first level of the uplink interference in the first spatial direction exceeds the first threshold level of uplink interference, and wherein the transmission of the reference signal is in at least the first spatial direction.

17. The cell of claim 10, wherein the connection of the cell to the UE based on the reference signal is a connection of the cell to the UE upon a selection, by the UE and based on the reference signal, of the cell as a serving cell.

18. The cell of claim 10, wherein the UE is an in-flight aircraft and the wireless network is an air-to-ground (ATG) connectivity wireless network.

* * * * *